UNITED STATES PATENT OFFICE.

FRITZ LEHMANN, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

REDDISH-BROWN SULFUR DYE.

No. 866,939.

Specification of Letters Patent.

Patented Sept. 24, 1907.

Application filed July 22, 1907. Serial No. 385,053.

*To all whom it may concern:*

Be it known that I, FRITZ LEHMANN, doctor of philosophy, chemist, a citizen of the German Empire, residing at Vohwinkel, near Elberfeld, Germany, have invented new and useful Improvements in Reddish-Brown Sulfur Dyes, of which the following is a specification.

In the specification for Letters Patent No. 818,980 dated April 24 1906 there is described the preparation of a sulfur dye by heating with alkali polysulfid in the presence of substances containing copper the amino-oxytoluphenazin of the following formula:

This compound (see Example II of the said specification) yields a dyestuff which contains copper and produces on unmordanted cotton in an alkalisulfid-bath bluish copper-red shades which are somewhat yellower than those obtained by means of the analogous coloring matter from amino-oxyphenazin (see Example I of the same specification). It has been stated in the said specification that the action of copper is entirely unexpected as (1) the shades obtained from aminooxazins with the addition of copper compounds are in most cases much redder than those produced with the dyestuffs which are formed in the same alkaline sulfid melt without the addition of copper compounds, and (2) because the dyeings of the colors prepared without the addition of copper compounds by a subsequent treatment with copper on fiber become muddy blue.

I have now found that aminooxytoluphenazin when heated under certain conditions with alkalipolysulfid without the addition of copper or copper compounds directly yields a valuable clear reddish-brown dye, which of course is free from copper and the dyeings of which on subsequent treatment with copper are not changed into muddy-blue but remain brown. My dye is, therefore, not anticipated by the specification of the said Letters Patent 818,980, inasmuch as the dye described there as obtainable from aminooxytoluphenazin exhibits properties entirely different from those of the dye which forms the object of my present invention.

The following example will serve to further illustrate the nature of my invention and the method of carrying it into practical effect, the parts being by weight: 15,8 parts of paraaminophenol and 18 parts of metatoluylendiamin are dissolved in 1000 parts of cold water. 10 parts of ammonia (20%) and 80 parts of manganperoxid are subsequently added. The mixture is as fast as possible heated to boiling and energetically boiled for about two hours. 50 parts of soda-lye containing 27 per cent of NaOH are added, the liquid is filtered and the hydrochlorid of the aminooxytoluphenazin is precipitated from the filtrate by the addition of common salt and an excess of hydrochloric acid. The resulting precipitate is pressed and subsequently mixed with such a quantity of a say 20 per cental sodiumsulfid solution as corresponds with 42 parts of pure $Na_2S$, and with 80 parts of sulfur. The mixture is heated with evaporation of water, until the temperature of the heated mass is 135° centigrade. At this temperature the mass is kept for about 20 hours employing a reflux condenser. After this time the melt is dried and subsequently ground. The color is thus obtained in the form of a dark brown powder. It can be used directly for dyeing.

My new dyestuff shows the following reactions: It is very easily soluble in water in the presence of sodium sulfid with a blackish-brown color, it is practically insoluble in soda-lye containing 27 per cent of NaOH, it dissolves in concentrated sulfuric acid (66° Baumé) with a dark brown color which by the addition of water first becomes redder a dark reddish-brown precipitate being finally separated. It dyes unmordanted cotton in a bath of sodium sulfid reddish-brown shades of great fastness the dyeings thus obtained remaining brown when treated on the fiber with copper salts.

Having thus described my invention and in what manner the same is to be performed, what I claim as new, and desire to secure by Letters Patent, is:—

The herein-described new reddish-brown sulfur dye obtainable by melting aminooxytoluphenazin of the formula

with alkaline sulfid and sulfur at about 135° centigrade, being a dark brown powder very easily soluble in water in the presence of sodium sulfid with a blackish brown color, being practically insoluble in soda-lye containing 27 per cent of NaOH, being dissolved by concentrated sulfuric acid (66° Bé) with a dark brown color which by the addition of water first becomes redder, a dark reddish-brown insoluble precipitate being finally separated, dyeing unmordanted cotton in a bath of sodium sulfid reddish-brown shades of great fastness,—the dyeings thus obtained remaining brown when treated on the fiber with copper salts, substantially as hereinbefore described.

In testimony whereof I have hereunto set my hand in the presence of two subscribing witnesses.

FRITZ LEHMANN. [L. S.]

Witnesses:
OTTO KÖNIG,
OSKAR KLUG.